United States Patent [19]

Rice et al.

[11] Patent Number: 4,812,941
[45] Date of Patent: Mar. 14, 1989

[54] CAPACITOR AND METHOD OF MANUFACTURE

[75] Inventors: Ronald B. Rice, Monroe; Edward M. Lobo, Shelton; Hector A. Casanova, Bridgeport; Theodore P. Kosnosky, West Haven, all of Conn.

[73] Assignee: Magnetec Corporation, Los Angeles, Calif.

[21] Appl. No.: 87,019

[22] Filed: Aug. 19, 1987

[51] Int. Cl.$^4$ ............................................. H01G 1/10
[52] U.S. Cl. ...................... 361/15; 361/272; 361/275
[58] Field of Search .................. 361/15, 103, 272–275, 361/316

[56] References Cited

U.S. PATENT DOCUMENTS

| | | | |
|---|---|---|---|
| 3,869,417 | 3/1975 | Ramsey | 524/68 |
| 4,454,561 | 6/1984 | Pearce et al. | 361/275 |
| 4,586,107 | 4/1986 | Price | 361/272 |

Primary Examiner—A. D. Pellinen
Assistant Examiner—Todd E. DeBoer
Attorney, Agent, or Firm—Darby & Darby

[57] ABSTRACT

A capacitor for a AC applications is manufactured from zinc alloy metallized polypropylene sheet material. The sheet material is wound into one or sections having a roll-shape, which sections are placed within a metal container and provided with electrical terminals for connecting to the exterior of the container. The metal container is then filled with a potting compound comprising 80%–90% blown asphalt and 10%–20% wax additive. When the potting compound sets, the capacitor sections are sealed therein so as to be protected from air, moisture and thermal and electrical shock. The container is then covered with a top which includes a pressure interrupter, and it is sealed. This capacitor exhibits improved resistance to deterioration due to environmental factors over long periods of time, and it permits operation with higher voltages than was previously possible.

18 Claims, 1 Drawing Sheet

4,812,941 ical interrupter which disconnects the capacitor from external terminals, in the event that there is excessive pressure or temperature within the container. In addition, the capacitor is impregnated with oil and the entire container is filled with oil, in order to seal out air and moisture. This avoids the possibility that air or moisture inside the capacitor might ionize and produce electrical arcing.

The problem with oil-filled capacitors is that the oils used are considered to present an environmental and health hazard. Accordingly, great care must be taken to avoid leakage of the oil from the capacitor casing while the capacitor is installed. In addition, disposal of capacitors that are no longer usable requires that they be subjected to special toxic waste treatment. In some instances, metallized capacitor sections for fluorescent lighting applications have been dipped in wax. However, wax exhibits a relatively high degree of shrinkage and has a tendency to develop cracks. In high voltage applications, air and/or moisture is likely to enter these cracks and results in early failure of the capacitor, owing to electrical arcing. Also, wax tends to be a relatively expensive material for use in capacitors.

Broadly, it is an object of the present invention to avoid the shortcomings of existing capacitors used for a AC applications. It is specifically contemplated that the invention provide a capacitor used for relatively high voltage AC applications which does not require a liquid impregnant in order to seal the capacitor against the entry of air and moisture.

It is another object of the present invention to provide a metal encased capacitor which does not require a liquid fill material, yet is resistive to failures due to the leakage of air and/or moisture thereinto, and which will continue to function reliably in relatively high voltage applications for extended periods of time.

It is also an object of the present invention to provide a capacitor for AC applications which is reliable, safe and convenient in use, yet relatively inexpensive in construction.

It is also an object of the present invention to provide a method for manufacturing a capacitor useful in AC applications which meets one or more of the foregoing objects.

In accordance with a preferred embodiment of the present invention, a capacitor for an AC application is manufactured from zinc alloy metallized polypropylene sheet material. The sheet material is wound into one or more sections having a roll-shape, which sections are placed within a metal container and provided with electrical terminals for connecting to the exterior of the container. The metal container is then filled with a potting compound comprising 80%–90% blown asphalt and 10%–20% wax additive. When the potting compound sets, the capacitor sections are sealed therein so as to be protected from air, moisture and thermal and electrical shock. The container is then covered with a top which includes a pressure interrupter, and it is sealed. This capacitor exhibits improved resistance to deterioration due to environmental factors over long periods of time, and it permits operation with higher voltages than was previously possible.

BRIEF DESCRIPTION OF THE DRAWING

The foregoing brief description, as well as further objects, features and advantages of the present invention will be more completely understood from the following detailed description of a presently preferred embodiment of the present invention, with reference being had to the accompanying drawing in which.

DETAILED DESCRIPTION OF THE PREFERRED EMBODIMENT

Figure 1:
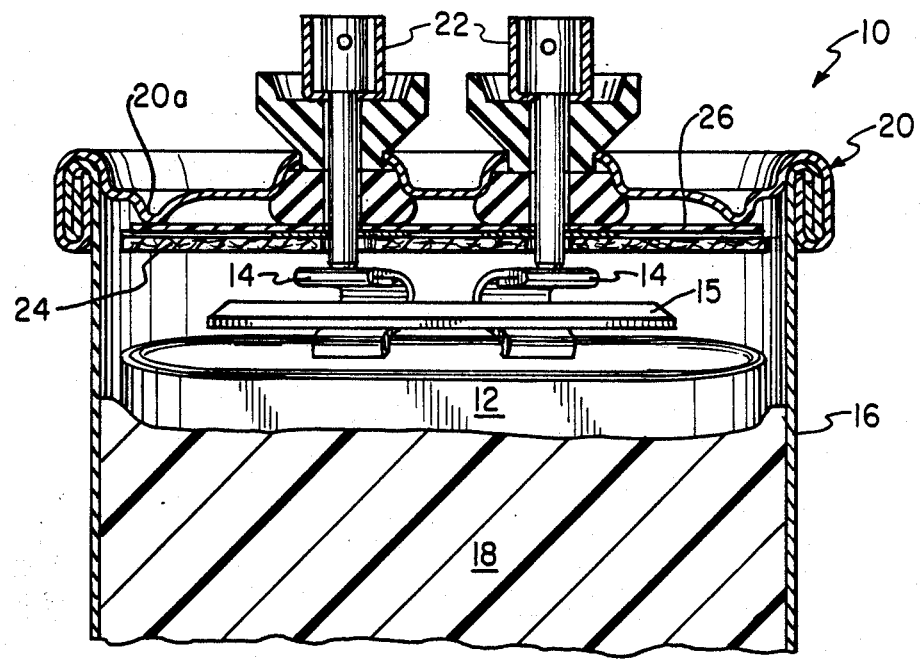
FIG. 1 is a fragmentary sectional view of a capacitor assembly embodying the present invention, with parts cut away to show internal details the capacitor assembly being shown in its position of normal use.

Referring now to the details of the drawing, there is illustrated a capacitor assembly 10 which is useful for AC applications. The capacitor includes one or more wound capacitor sections 12 which are made of a dielectric film that has been metallized to form the plates of the capacitor. The film is wound in a roll shape, provided with electrical contacts 14, 14, and placed within a metal container 16. Container 16 is filled with an insulating potting material 18, which is solid under operating conditions of the capacitor. The potting material also encapsulates the metallized film, so as to seal it against air and moisture. Although the potting material fills the container 18 and encapsulates the metalized film, it is shown broken away in the upper portions of FIGS. 1 and 2, in order to permit the components in the upper portion of the interior of the container to be seen. The potting compound also provides electrical and thermal insulation between the metallized film and the exterior of the capacitor. A cover assembly 20 is then placed on top of the container and is secured thereto, as by crimping. The cover assembly 20 includes terminals 22 for making contact with the capacitor section 12 inside the casing, as well as a pressure interrupter assembly (discussed further below), which provides for disconnection of the terminals 22 from the internal capacitor section, in the event of excessive internal pressure.

The metallized dielectric sheet material from which the capacitor section is wound is preferably made of biaxially oriented polypropylene, but it may also be made of polyethylene terephthalate, polycarbonate or polysulfone. The metalization is preferably zinc/aluminum alloy, although it may also be aluminum, zinc, copper/aluminum alloy or copper/zinc/aluminum alloy. The preferred material for forming the capacitor section is a zinc/aluminum alloy polypropylene film which exhibits a resistivity of 4–8 ohms per square. This film is commercially available, for example from Steinerfilm, Inc. of Williamstown, Mass. When this preferred metallized film is utilized in conjunction with the potting compound described below, a substantial improvement is obtained in accelerated life tests, as compared with conventional capacitors, and the resulting capacitor may be used at voltages up to 500 volts AC. Existing metallized film capacitors are presently limited to an operating voltage of 350 volts AC.

The potting compound is 80%-90% blown asphalt and 10%-20% wax additive. Blown asphalt is utilized, in order to obtain a higher melting temperature. The wax lowers the viscosity of the potting compound so that it pours readily and sets quickly. The blown asphalt is formulated to have a softening point between 190° and 250° F. and, preferably, in the range of 205°-220° F., as determined by ASTM standard 36-46. The asphalt should have a needle penetration of no more than 1.2 mm (ASTM standard D-5) and, preferably, no more than 0.8 mm. In addition, its viscosity as determined by the Brookfield thermal cell method with spindle No. 27 should be in excessive of 100 centepoise at 280° F. and preferably 450±50 centepoise. The wax is preferably ethylene bis-steramide.

Potting of the capacitor section is achieved by heating the potting compound to a temperature of 250°-350° F., and preferably 280° F., and pouring into the metal casing so as to surround and encapsulate the capacitor winding and it may come up to the level of insulator 15, which prevents short circuits between the electrodes 14, 14 across the top of the capacitor section 12. The relatively low viscosity of the potting compound permits entrapped air to escape, yet it sets quickly to a relatively hard consistency.

The hardened potting compound has a very high Cleveland Open Cup flash point of 550° F., and it is flexible enough to withstand thermal cycles from 100° C. to −30° C. without cracking or running. The material also has excellent electrical and thermal insulation properties and is inert to the dielectrical sheet material and its metallized surface. It therefore provides an excellent protective environment for the metallized film capacitor section, without interfering in any way with the operation of the pressure interrupter.

After the potting compound hardens, the cover assembly 20 is placed upon the casing 16 and is crimped into position. In this position the bottoms of the terminals 22 are welded to the electrical contacts 14. This welded connection is broken by an excessive internal pressure developed within the casing 16. Therefore, the terminals 22 can move with respect to the electrical contacts 14.

Figure 2:
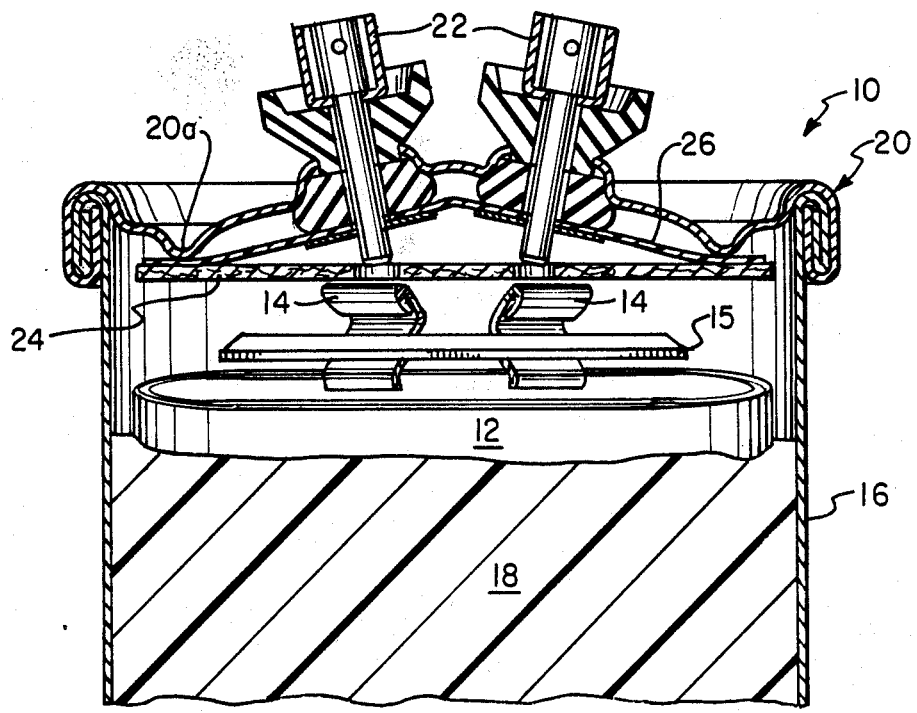
FIG. 2 is a sectional view similar to FIG. 1 showing the capacitor assembly with the pressure interrupter activated so as to disconnect the capacitor terminals.

The cover assembly 20 is provided with an indent 20(a), as a result of which the cover may experience a certain amount of bending movement (compare FIGS. 1 and 2). Below the cover, there is provided a pressure interrupter comprising an insulated panel 24 and a barrier 26. The barrier 26 is designed so as to bend upwardly at its center (see FIG. 2) when an excess of internal pressure within the casing 16 presses against an inside surface thereof. This causes the cover 20 to similarly bend upwardly, whereby terminals 22 are disconnected from their respective contacts 14. The capacitor winding inside the capacitor assembly is thereby electrically disconnected from the external electrical circuit under excessive pressure conditions within the casing.

Although a preferred embodiment of the invention has been disclosed for illustrative purposes, those skilled in the art will appreciate that many additions, modifications and substitutions are possible, without departing from the scope and the spirit of the invention as disclosed in the accompanying claims.

What is claimed is:
1. A capacitor assembly comprising;
a metal housing;
a zinc alloy metallized dielectric sheet material wound into a roll-shape and disposed within said housing;
a potting compound provided within said housing so as to encapsulate said metallized sheet material, said potting compound being a blend of asphalt and wax additive;
means for providing an electrical connection between said sheet material and the exterior of said housing; and
means within said housing for interrupting said electrical connection upon the occurrence of an excessive pressure within said housing.

2. A capacitor in accordance with claim 1 wherein said potting compound comprises 80-90% blown asphalt and 10-20% wax additive.

3. A capacitor assembly in accordance with claim 2 wherein said blown asphalt is formulated so as to have a softening point between 190° and 250° F., a needle penetration of no more than 1.2 mm and a viscosity of at least 100 centipoise at 280° F.

4. A capacitor assembly in accordance with claim 3 wherein said potting compound is formulated so as to have a softening point in the range of 205°-220° F.

5. A capacitor assembly in accordance with claim 3 wherein said potting compound is formulated so as to have a needle penetration of no more than 0.8 mm.

6. A capacitor assembly in accordance with claim 3 wherein said potting compound is formulated so as to have a viscosity of 450±50 centipoise at 280° F.

7. A capacitor assembly in accordance with claim 1 wherein said metallized dielectric sheet material is zinc alloy metallized polypropylene.

8. A capacitor assembly in accordance with claim 7 wherein said blown asphalt is formulated so as to have a softening point between 190° and 250° F., a needle penetration of no more than 1.2 mm and a viscosity of at least 100 centipoise at 280° F.

9. A capacitor assembly in accordance with claim 7 wherein said potting compound is formulated so as to have a softening point in the range of 205°-220° F.

10. A capacitor assembly in accordance with claim 7 wherein said potting compound is formulated so as to have a needle penetration of no more than 0.8 mm.

11. A capacitor assembly in accordance with claim 7 wherein said potting compound is formulated so as to have a viscosity of 450±50 centipoise at 280° F.

12. A capacitor assembly in accordance with claim 1 wherein said metallized dielectric sheet material is zinc-/aluminum alloy metallized polypropylene.

13. A capacitor assembly in accordance with claim 12 wherein said blown asphalt is formulated so as to have a softening point between 190° and 250° F., a needle penetration of no more than 1.2 mm and a viscosity of at least 100 centipoise at 280° F.

14. A capacitor assembly in accordance with claim 12 wherein said potting compound is formulated so as to have a softening point in the range of 205°-220° F.

15. A capacitor assembly in accordance with claim 12 wherein said potting compound is formulated so as to have a needle penetration of no more than 0.8 mm.

16. A capacitor assembly in accordance with claim 12 wherein said potting compound is formulated so as to have a viscosity of 450±50 centipoise at 280° F.

17. A method for manufacturing a capacitor assembly, said capacitor assembly being of the type including a metal housing, a zinc alloy metalized dielectric sheet material wound into a roll-shape and disposed within said housing, a potting compound provided within said housing so as to encapsulate said metalized sheet material, said potting compound being a blend of asphalt and wax additive, means for providing an electrical connection between said sheet material and the exterior of said housing, and means within said housing for interrupting said electrical connection upon the occurrence of an excessive pressure within said housing, said method comprising the steps of placing said wound sheet material in said container, heating the potting compound to a temperature of 250°-350° F. and pouring the potting compound into said metal casing so as to cover and encapsulate said sheet material.

18. The method of claim 17 wherein said compound is heated to a temperature of 280° F.

* * * * *

UNITED STATES PATENT AND TRADEMARK OFFICE
CERTIFICATE OF CORRECTION

PATENT NO. : 4,812,941

DATED : March 14, 1989

INVENTOR(S) : Ronald B. Rice et al

It is certified that error appears in the above-identified patent and that said Letters Patent is hereby corrected as shown below:

On the title page Insert

--(73) Assignee: MagneTek, Inc., Los Angeles, Calif. --.

Signed and Sealed this

Twenty-seventh Day of February, 1990

Attest:

JEFFREY M. SAMUELS

Attesting Officer     Acting Commissioner of Patents and Trademarks